(12) United States Patent
Ekholm

(10) Patent No.: US 6,371,526 B1
(45) Date of Patent: Apr. 16, 2002

(54) QUICK CONE

(75) Inventor: Rolf Ekholm, Karlstad (SE)

(73) Assignee: Kvaerner Pulping AB (SE)

( * ) Notice: Subject to any disclaimer, the term of this patent is extended or adjusted under 35 U.S.C. 154(b) by 0 days.

(21) Appl. No.: 09/631,027

(22) Filed: Aug. 2, 2000

(30) Foreign Application Priority Data

Aug. 4, 1999 (SE) .............................................. 9902835

(51) Int. Cl.$^7$ ............................................... F16L 25/00
(52) U.S. Cl. ............................. 285/148.23; 285/288.1; 285/148.25; 285/148.24; 285/192
(58) Field of Search .................... 285/288.1, 192, 285/148.18, 148.23, 148.24, 148.25, 193, 194

(56) References Cited

U.S. PATENT DOCUMENTS

| | | | | |
|---|---|---|---|---|
| 715,423 A | * | 12/1902 | Ryan | 285/148.25 |
| 764,347 A | * | 7/1904 | Carlson | 285/148.25 |
| 1,094,309 A | * | 4/1914 | Daw | 285/148.24 |
| 2,791,448 A | * | 5/1957 | Jackes et al. | 285/148.24 |
| 3,680,896 A | * | 8/1972 | Cupit | 285/148.23 |
| 3,741,590 A | * | 6/1973 | Zuardi | 285/148.23 |
| 4,750,411 A | * | 6/1988 | Eversole | 285/192 |
| 5,295,760 A | * | 3/1994 | Rowe | 285/192 |
| 5,427,263 A | * | 6/1995 | Bowles | 285/192 |
| 5,667,254 A | * | 9/1997 | Rolland | 285/192 |

* cited by examiner

*Primary Examiner*—Eric K. Nicholson
(74) *Attorney, Agent, or Firm*—Fasth Law Offices; Rolf Fasth

(57) ABSTRACT

The invention relates to a quick cone (1) for pipe assemblies for conducting fiber suspensions wherein the quick cone provides a transition from a pipe (8) with a greater diameter to a pipe (9) with a smaller diameter as seen in the flow direction of the fiber suspension. The invention is characterized therein that the quick cone (1) has a pipe (2) wherein the pipe (2) has a major portion of its axial extension concentrically enclosed by a jacket (3) that includes a conical jacket portion (4) that is shaped as a cut cone and a cylindrical connection segment (5) where a thicker end of the conical jacket portion (4) is in engagement with the cylindrical connection segment (5) that has substantially the same diameter as the larger diameter pipe (8) and the pipe (2) has substantially the same diameter as the smaller diameter pipe (9) and wherein the more pointed end of the jacket portion (4) is tightly attached to the pipe (2).

7 Claims, 3 Drawing Sheets

QUICK CONE

TECHNICAL FIELD

The invention relates to a quick cone for pipe assemblies for conducting fiber suspensions wherein the quick cone provides a transition from a pipe with a larger diameter to a pipe with a smaller diameter as seen in the flow direction of the fiber suspension.

PRIOR ART

The design of transitions in pipe assemblies from one pipe that has a larger diameter to a pipe with a smaller diameter, as seen in the flow direction, create both process technical and construction problems.

The process technical problems of fiber suspensions, such as cellulose pulp suspensions, when a pipe cone is used for such reductions of the pipe diameter, are that the pulp forms clogs at the pipe cone with the resulting stoppage of the pulp flow.

Construction problems at the transitions can, for example, be the axial load that must be taken up at the transition from one pipe that has a larger diameter to a pipe that has a smaller diameter, due to the to pressure difference that occurs in the fluid when the pipe diameter is reduced.

FIG. 1 shows an example of an element, according to a known technique, for a transition from a pipe that has a larger diameter to a pipe that has a smaller diameter, as seen in the flow direction, for conducting a cellulose pulp suspension. The element is constructed with a big and relatively sturdy flange that is connected to the pipe with the larger diameter. The pipe with the smaller diameter is connected to the center of the flange. To avoid the problem of clogging, the transition is here not shaped as a gradual change of the diameter but is abrupt.

This eliminates the problem of clogging of fiber suspensions such as cellulose suspensions, but requires that the pressure must instead be taken up by a sturdy flange band which results in a high weight of the transition element between the two diameters.

U.S. Pat. No. 715,423 describes a transition from a pipe that has a smaller diameter to a pipe that has a larger diameter wherein the pipe with the smaller diameter is a connection pipe of metal and the pipe with the larger diameter is a pipe of a pottery material etc. It is used for sewer water and the transition occurs from a pipe with a smaller diameter to a pipe with a larger diameter, as seen in the flow direction.

SUMMARY OF THE INVENTION

The invention relates to a quick cone for pipes for conducting fiber suspensions wherein the quick cone provides a transition from a pipe with a greater diameter to a pipe with a smaller diameter, as seen in the flow direction of the fiber suspension. The object of the invention is to provide a short, that is quick, substantially conical transition that is shaped so that it does not get clogged up by the fiber suspension. The invention also has a low weight.

DETAILED DESCRIPTION OF PREFERRED EMBODIMENTS OF THE INVENTION

Figure 1:
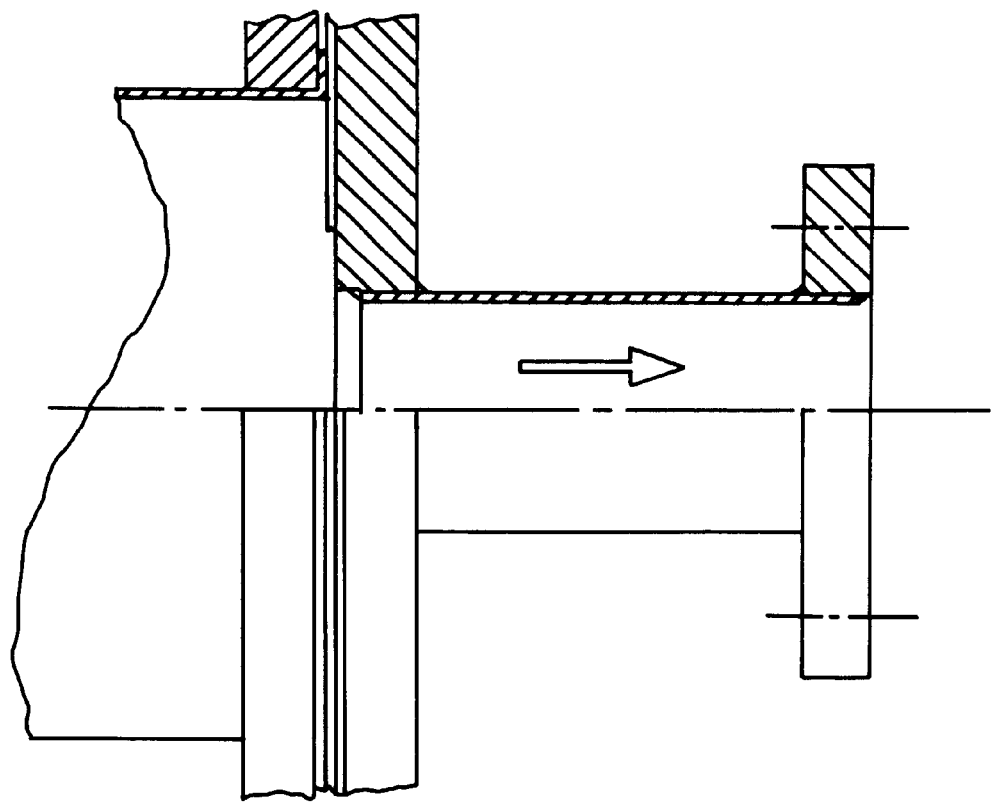
FIG. 1 shows a transition element according to a known technique.
Figure 2:
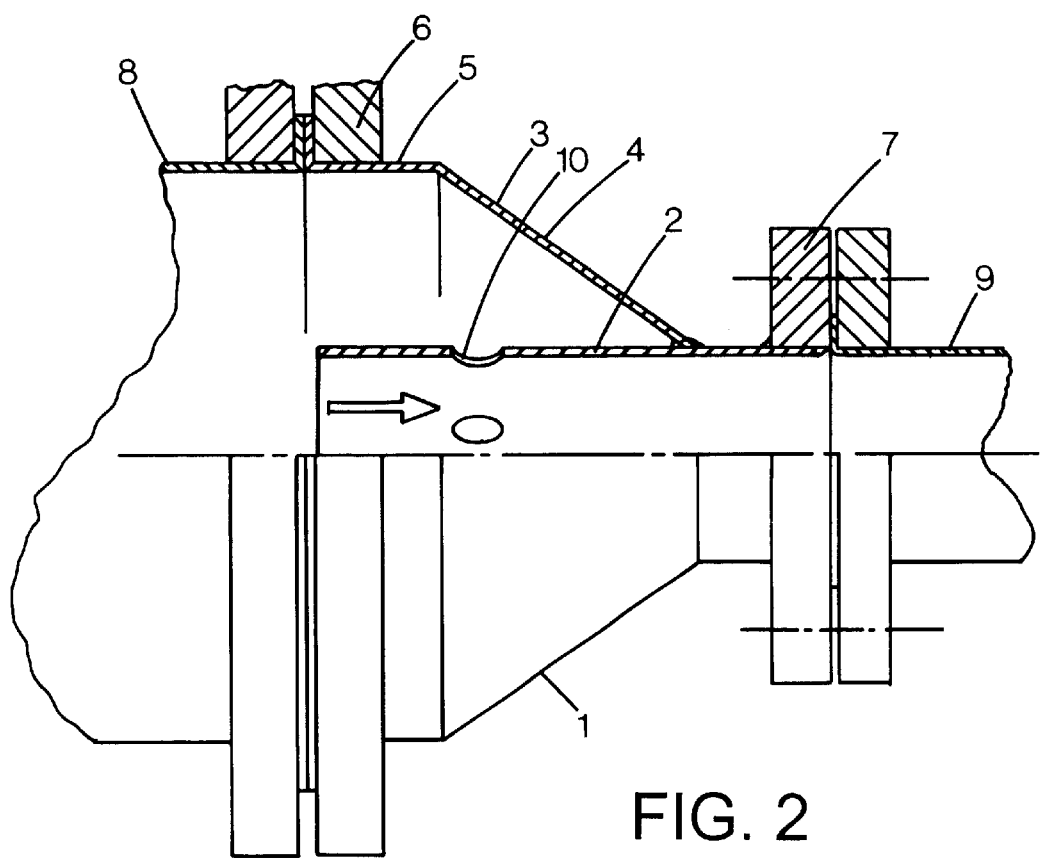
FIG. 2 shows an embodiment of the quick cone according to the invention.

FIG. 2 shows an embodiment of the quick cone 1 according to the invention for a transition between an acid resistant pipe 8 that has a diameter of 300 mm and an acid resistant pipe 9 that has a diameter of 100 mm. The connector 1, that is also made of an acid resistant material, includes a pipe 2 and a jacket 3 that has a conical jacket portion 4 and a cylindrical connection segment 5. Almost the entire length of the pipe 2 is concentrically enclosed by the jacket 3. The pipe 2 has substantially the same diameter as the pipe 9 and the connection segment 5, that has the same diameter as the thicker end of the conical jacket portion 4, or base diameter, has substantially the same diameter as the pipe 8. The more pointed end of the conical jacket portion 4, or top diameter, encloses and has a welded band tightly attached to the pipe 2. To easier connect the connection to the smaller pipe 9, the pipe 2 extends a bit beyond the more pointed end of the conical jacket portion 3.

The pipe 2 is, in one embodiment, equipped with, for example, sex pressure relieving openings 10 on the portion of the pipe 2 that is located inside the jacket 3. This embodiment has six pressure relieving openings that, preferably, have a diameter of 25 mm. The quick cone 1 has, in this embodiment, flange bands 6, 7, to be connected to the larger pipe 8 and the smaller pipe 9, respectively. The flange bands can, of course, also be replaced by weld bands or be shaped in other ways.

Because the conical jacket portion 4 is to absorb a substantial amount of the whole axial load, the connection to the bigger pipe can be made simpler and with less weight, as a result, and thus at a lower cost. Standard components can also be used for the quick cone 1 to make it easier to pre-fabricate the connector. The pressure releasing openings 10 have the purpose of reducing the load on the pipe 2 so that it is not compressed. Because the pipe 2 extends into the jacket 3, the occurrence of clogs in the quick cone 1 is prevented.

Figure 3:
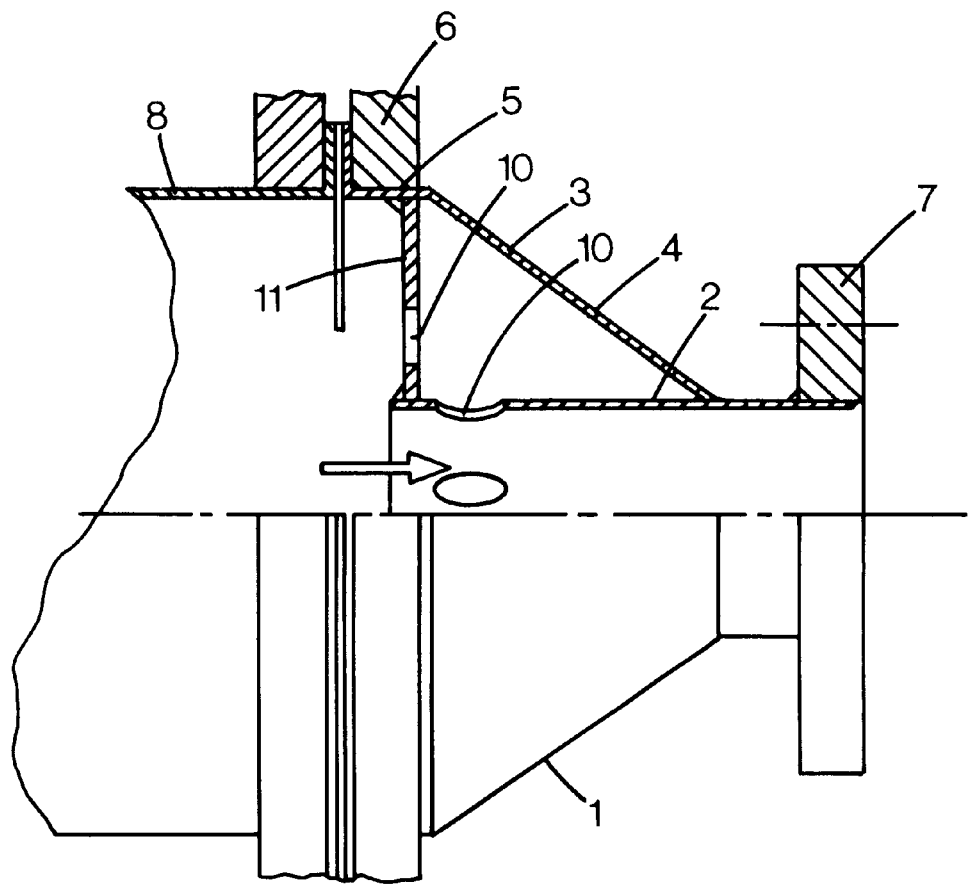
FIG. 3 shows an alternative embodiment of the quick cone according to the invention.

FIG. 3 shows another embodiment of the quick cone 1 according to the invention. The quick cone 1 is here made with a bottom sheet 11 that is perpendicularly disposed relative to the axial extension of the quick cone 1. The bottom sheet 11 has an inner diameter that substantially corresponds to the outer diameter of the pipe 2 and is rigidly secured thereto and the bottom sheet 11 has an outer diameter that substantially corresponds to the inner diameter of the connection segment 5 and is rigidly secured thereto. Both the bottom sheet 11 and the pipe 2 have pressure releasing openings 10. They have six openings each that have a 25 mm diameter at the pipe dimensions that are shown in FIG. 2.

The embodiment according to FIG. 3 increases the mechanical strength of the quick cone 1 while at the same time most of the load in the axial direction is taken up by the conical jacket portion 3 and the occurrence of clogs is prevented.

While the present invention has been described in accordance with preferred compositions and embodiments, it is to be understood that certain substitutions and alterations may be made thereto without departing from the spirit and scope of the following claims.

The dimensions and material that are mentioned in this description are only examples of embodiments of the invention and are not to be interpreted to limit the invention.

What is claimed is:

1. A conical connector assembly for connecting pipes that conduct fiber suspensions, comprising:

a first pipe portion having a first diameter;

a second pipe portion having a second diameter, the first diameter being greater than the second diameter;

a third pipe portion having a first end in operative engagement with the second pipe portion, the third pipe has an axial extension and a third diameter that is substantially identical to the second diameter of the second pipe portion;

a jacket comprising a conical jacket portion and a cylindrical connection segment, the jacket concentrically enclosing a substantial part of the axial extension of the third pipe portion, the conical jacket portion having a truncated top portion and a cylindrical bottom portion, the cylindrical bottom portion being in operational engagement with the cylindrical connection segment, the cylindrical connection segment having a fourth diameter being substantially identical to the first diameter, the truncated top portion being tightly attached to the third pipe portion.

2. The conical connector assembly according to claim 1 wherein the third pipe portion has a segment that is disposed inside the jacket and the segment inside the jacket has pressure releasing openings defined therein.

3. The conical connector assembly according to claim 2 wherein the conical connector assembly also has a bottom sheet that is perpendicularly disposed relative to the third pipe portion, the bottom sheet has an inner diameter that substantially corresponds to the third diameter of the third pipe portion and is rigidly secured thereto and the bottom sheet has an outer diameter that substantially corresponds to an inner diameter of the cylindrical connection segment and is rigidly secured thereto and the bottom sheet has pressure releasing openings defined therein.

4. The conical connector assembly according to claim 3 wherein the third pipe portion has a length that is disposed inside the jacket and is at least as long as the jacket.

5. The conical connector assembly according to claim 4 wherein the third pipe portion has a length that is disposed inside the jacket and is at least as long as half of a length the jacket.

6. The conical connector assembly according to claim 1 wherein the truncated top portion of the jacket is tightly welded to the third pipe portion.

7. The conical connector assembly according to claim 1 wherein the fiber suspension is a cellulose pulp suspension.

* * * * *